Feb. 1, 1938.  C. S. ASH  2,107,229
BRAKE DRUM
Filed Dec. 2, 1935
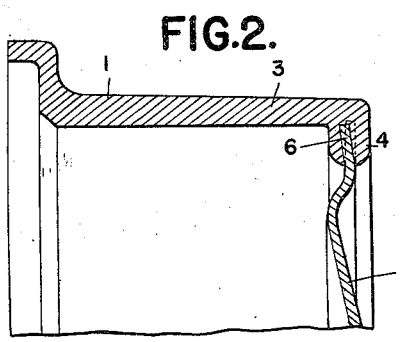
FIG.2.
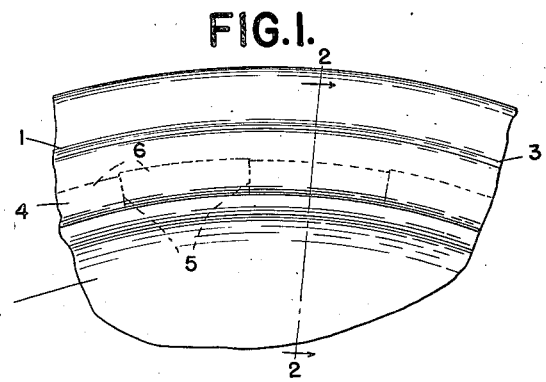
FIG.1.
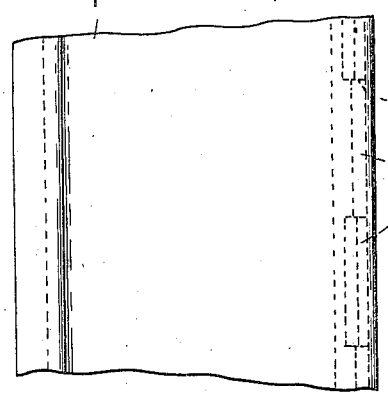
FIG.3.
FIG.4.
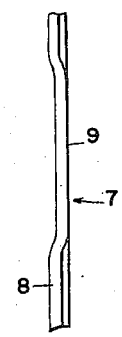
FIG.5.
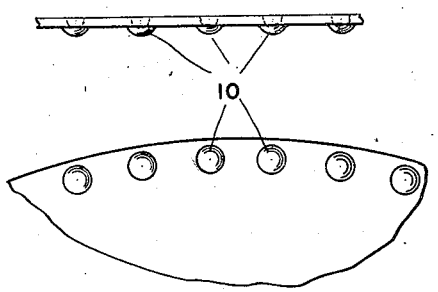
FIG.6.
FIG.8.
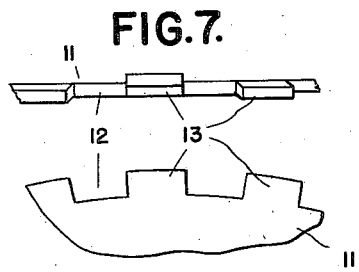
FIG.7.
FIG.9.
INVENTOR
CHARLES S. ASH
BY
ATTORNEYS Patented Feb. 1, 1938

2,107,229

UNITED STATES PATENT OFFICE 2,107,229

BRAKE DRUM

Charles S. Ash, Milford, Mich., assignor to Kelsey-Hayes Wheel Company, Detroit, Mich., a corporation of Delaware Application December 2, 1935, Serial No. 52,571

10 Claims. (Cl. 188—218)

The invention relates to brake drums and refers more particularly to composite brake drums designed especially for use with motor vehicle wheels.

The invention has for one of its objects to provide a composite brake drum which has ample strength to withstand the stresses to which it may be subjected in use and which may be manufactured at relatively low cost. The invention has for another object to provide a brake drum formed of a brake ring cast on to a back and effectively mechanically interlocked therewith. The invention has for a further object the combinations and arrangements of parts as more fully hereinafter set forth.

In the drawing:

Figure 1 is a side elevation of a portion of a brake drum showing an embodiment of my invention;

Figure 2 is a cross section on the line 2—2 of Figure 1;

Figure 3 is a side elevation of a portion of the brake drum;

Figure 4 is an edge elevation of a portion of the back of the brake drum;

Figures 5, 6, and 7 are views similar to Figure 4 showing other embodiments of my invention;

Figure 8 is a side elevation of Figure 6;

Figure 9 is a side elevation of Figure 7.

Referring to Figures 1, 2, 3, and 4, the composite brake drum comprises the brake ring 1 and the back 2. The brake ring is preferably formed of a suitable cast metal to provide a good wearing braking surface and the back is preferably formed of sheet metal, such as sheet steel. As shown, the brake ring has an internal braking surface which is formed in the annular portion 3. The brake ring also has extending generally radially inwardly from one edge of the annular portion the portion or flange 4 in which is imbedded the peripheral portion of the back. The peripheral portion of the back is radially slit at 5 to provide angularly spaced tongues 6 and alternate tongues are bent in an axial direction and out of the plane of the remaining tongues to extend at an angle thereto. As a result of this axial offsetting, the brake ring which is cast on to and imbeds the tongues is effectively mechanically interlocked with the back. Furthermore, the corner portions of the tongues fuse with the brake ring so that the brake ring and back are also molecularly bonded together.

Figure 5 discloses another modification of back 7, which is also preferably formed of sheet steel. This back, instead of having a radially slit peripheral portion, has its peripheral portion provided with the angularly spaced portions or flutes 8 which are depressed axially out of the plane of the remaining portions 9, whereby the brake ring when cast on the back will be effectively mechanically interlocked with the back.

Figures 6 and 8 disclose another modification of back which is also preferably formed of sheet steel. This back has its peripheral portion which is to be imbedded in the brake ring formed with the axially extending depressed portions or cups 10, which serve with the intermediate peripheral portions to mechanically interlock the brake ring with the back.

In the modification illustrated in Figures 7 and 9, the sheet steel back 11 has its peripheral portion notched at 12 to provide the angularly spaced tongues 13 between the notches. Successive tongues are bent axially in opposite directions to provide two sets of tongues with the tongues of each set alternating with the tongues of the other set and inclined axially toward their radially outer ends in opposite directions.

What I claim as my invention is:

1. A composite brake drum, comprising a back having alternate angularly spaced peripheral portions axially offset relative to each other, and a brake ring cast on to said portions and mechanically interlocked therewith.

2. A composite brake drum, comprising a sheet metal back having generally radially extending angularly spaced portions with alternate portions axially offset relative to each other at their radially outer ends, and a brake ring cast on to said portions and mechanically interlocked therewith.

3. A composite brake drum, comprising a back having angularly spaced peripheral portions with alternate portions inclined axially toward their radially outer ends away from the intermediate portions, and a ring cast on to all of said portions and mechanically interlocked therewith.

4. A composite brake drum, comprising a back having generally radially extending peripheral tongues spaced from each other circumferentially of the drum, certain of said tongues having portions axially offset relative to corresponding portions of other of said tongues, and a brake ring cast on to said tongues and mechanically interlocked therewith.

5. A composite brake drum, comprising a back having generally radially extending peripheral tongues spaced from each other circumferentially of the drum, certain of said tongues being inclined axially toward their radially outer ends away from the other of said tongues, and a brake ring cast on to said tongues and mechanically interlocked therewith.

6. A composite brake drum, comprising a back having generally radially extending peripheral tongues spaced from each other circumferentially of the drum, successive tongues being inclined axially in opposite directions toward their radially outer ends, and a brake ring cast on to said tongues and mechanically interlocked therewith.

7. A brake drum, comprising a sheet metal back having angularly spaced depressed peripheral portions axially offset relative to portions therebetween, and a brake ring cast on to said portions and mechanically interlocked therewith.

8. A composite brake drum, comprising a sheet metal back having angularly spaced peripheral flutes axially offset relative to portions therebetween, and a brake ring cast on to said flutes and portions therebetween and mechanically interlocked therewith.

9. A composite brake drum, comprising a sheet metal back having angularly spaced axially extending peripheral cup portions, and a brake ring cast on to said cup portions and the peripheral portions of said back between said cup portions.

10. A composite brake drum, comprising a sheet metal back having alternate angularly spaced peripheral portions axially offset relative to each other, and a cast metal brake ring having a generally radially extending portion cast on to said portions and mechanically interlocked therewith, and an annular portion extending from said generally radially extending portion.

CHARLES S. ASH.